United States Patent [19]
Mulasmajic

[11] 3,809,433
[45] May 7, 1974

[54] ANTI-FRICTION VEHICLE SUPPORT SYSTEM

[76] Inventor: Dzemal Mulasmajic, 338 Pleasant Hill Blvd., Palatine, Ill. 60067

[22] Filed: Nov. 20, 1972

[21] Appl. No.: 308,115

Related U.S. Application Data

[63] Continuation-in-part of Ser. Nos. 175,940, Aug. 30, 1971, Pat. No. 3,719,395, and Ser. No. 210,923, Dec. 22, 1971, Pat. No. 3,734,565.

[52] U.S. Cl............ 301/1, 104/23 FS, 104/148 MS, 180/125
[51] Int. Cl................................. B60v 3/04
[58] Field of Search ........ 301/1, 5 R; 180/119, 124, 180/125, 126, 116; 104/23 FS, 155, 148 MS; 308/10, 9; 152/53, 55; 305/7, 34

[56] References Cited
UNITED STATES PATENTS

| | | | |
|---|---|---|---|
| 833,635 | 10/1906 | Rogers | 104/148 MS |
| 3,013,505 | 12/1961 | Burke | 104/155 |
| 3,125,964 | 3/1964 | Silverman | 308/10 |
| 3,233,559 | 2/1966 | Smith | 104/23 FS |
| 3,530,798 | 9/1970 | Faure | 104/155 |
| 3,586,141 | 6/1971 | Hennessey | 104/23 FS |
| 3,055,446 | 9/1962 | Vaughen | 180/125 |
| 3,513,934 | 5/1970 | Crowley | 308/9 |
| 3,719,405 | 3/1973 | Izumi | 308/9 |
| 809,048 | 1/1906 | Furchtbar | 180/9.2 R |

*Primary Examiner*—Robert S. Ward, Jr.
*Assistant Examiner*—Reinhard J. Eisenzopf
*Attorney, Agent, or Firm*—Hill, Gross, Simpson, Van Santen, Steadman, Chiara & Simpson

[57] ABSTRACT

A magnetic wheel for supporting a vehicle employs a permanent magnet or an electromagnet in the shape of a ring which is journalled for rotation about a shaft. The shaft is loosely coupled to the frame of the vehicle for vertical movement by means of a member which positions a permanent magnet or an electromagnet within the ring which is poled to repel the ring. The wheel is adapted for steering by providing that the loose coupling includes a pivotal coupling and by providing a lever arm for connection to a steering mechanism, such as a rack and pinion mechanism. Another embodiment utilizes a high pressure low leakage piston instead of the magnets within the ring, and a ski-like support utilizes a controlled high pressure air system to support a rail-type vehicle.

7 Claims, 11 Drawing Figures

PATENTED MAY 7 1974  3,809,433
SHEET 1 OF 2
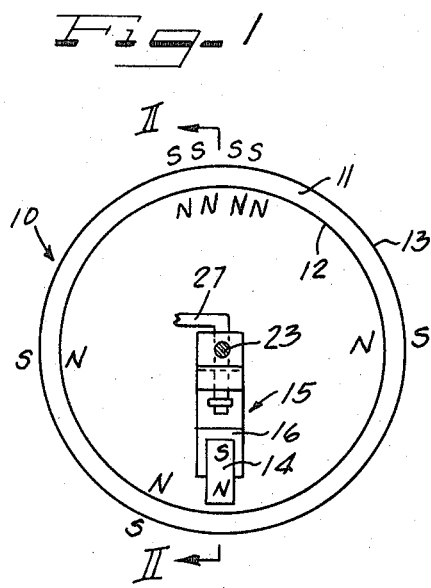
Fig. 1
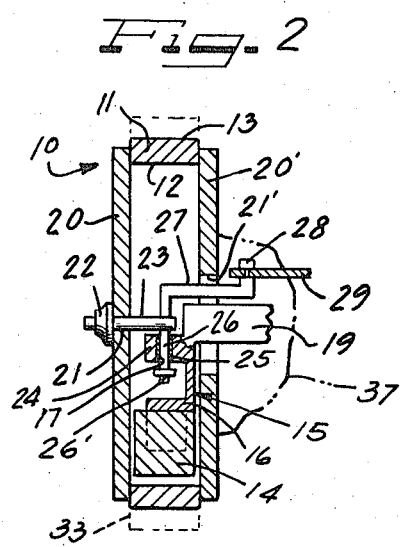
Fig. 2
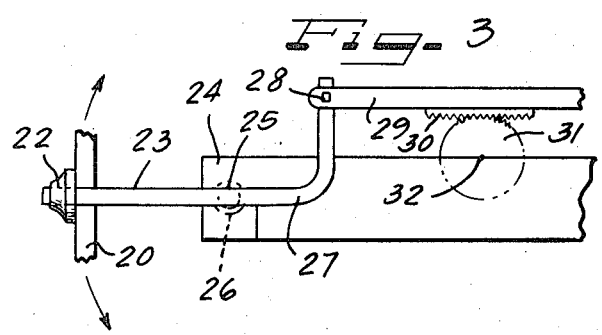
Fig. 3
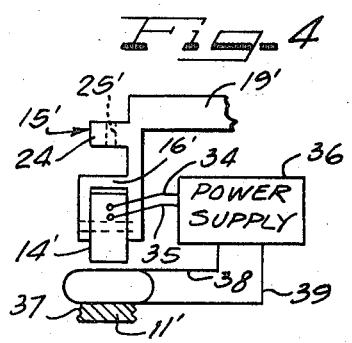
Fig. 4
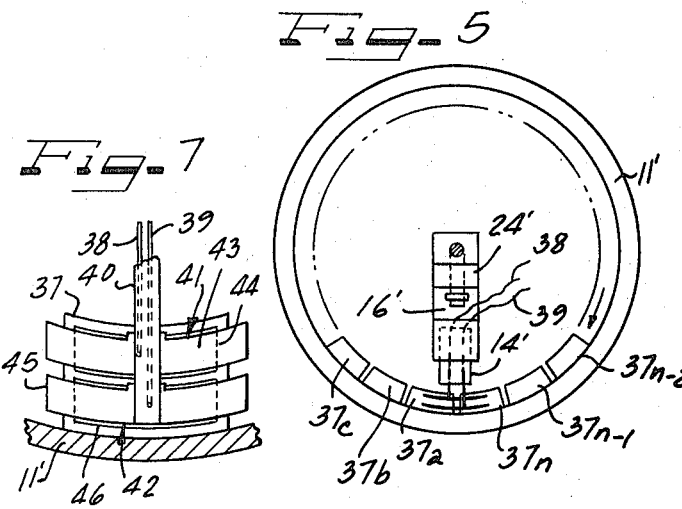
Fig. 5 / Fig. 7
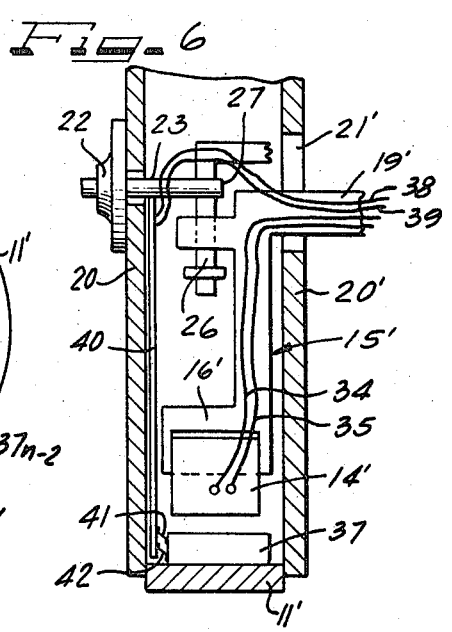
Fig. 6

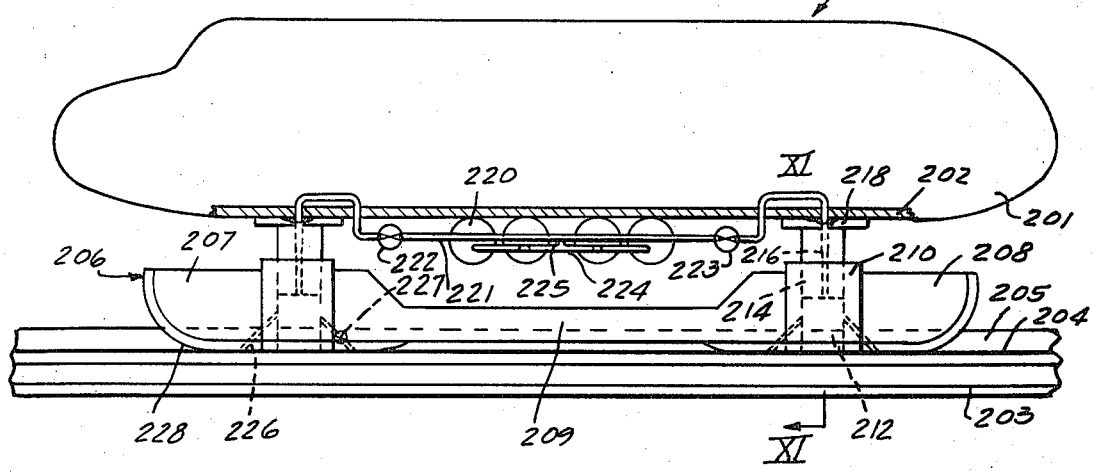
Fig-10
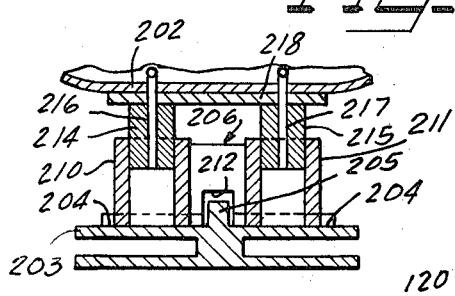
Fig-11
Fig-8
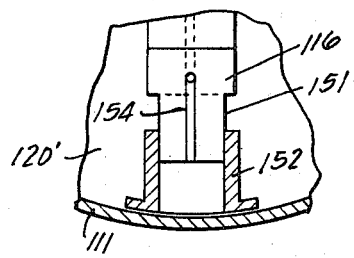
Fig-9

ANTI-FRICTION VEHICLE SUPPORT SYSTEM

CROSS REFERENCE TO RELATED APPLICATIONS

This application is a continuation-in-part of my earlier applications Ser. No. 175,940, filed Aug. 30, 1971, now U.S. Pat. No. 3,719,395, and Ser. No. 210,923, filed Dec. 22, 1971, now U.S. Pat. No. 3,734,565.

BACKGROUND OF THE INVENTION

1. Field of the Invention

The invention relates to vehicle support systems and is more particularly concerned with the provision of anti-friction support means for supporting a vehicle.

2. Description of the Prior Art

The art magnetism in general has taken particular cognizance of the many benefits offered through the utilization of the forces of attraction and repulsion provided by magnets. These forces have been utilized to great advantage in magnetic bearings, for example. However, magnetic bearing structures require a design which may become quite complicated in that it is desired to maintain the rotating mechanism aligned with respect to its axis of rotation. In the field of transportation, there have been several attempts to utilize magnetic bearing structures to relieve and support loads on, for example, railway cars. These techniques have generally employed the provision of electromagnets having many winding turns in order to provide sufficient lifting forces for the vehicle. In transportation systems, there is also the difficulty of feeding the electromagnets by means of rails or the like.

The utilization of the movement of a great volume of air at a generally low speed is well recognized in the art for providing a "cushion" of air beneath a hovercraft. In hovercraft, however, the lifting and propulsion system is quite large and noisy and provides undesirable effects in the adjacent area.

SUMMARY OF THE INVENTION

The primary object of the invention is to provide a new and improved vehicle support system using the lifting forces provided in the art of magnetism or the lifting forces provided in a controlled leakage fluid pressure system, gas or liquid, including a simple wheel structure which utilizes such lifting forces.

Another object of the present invention is to provide a wheel of simple construction for supporting vehicles, the wheel, according to a feature of the invention, being rotatable about an axis which is not fixed, and which is rendered free for vertical movement with respect to the associated vehicle by means of a unique wheel to frame coupling.

It is a still further object of the invention to provide a magnetic wheel that is freely rotatable about a horizontal axis for movement of the associated vehicle and further freely pivotal about a vertical axis for steering the associated vehicle.

Another object of the invention is to provide a vehicle support system for a rail type vehicle in which the vehicle is supported on a layer of fluid derived from a controlled means.

BRIEF DESCRIPTION OF THE DRAWING

Other objects, features and advantages of the invention, its organization, construction and operation will be best understood from the following detailed description of an embodiment thereof taken in conjunction with the accompanying drawing, in which:

FIG. 1 is an elevational view of a magnetic wheel constructed in accordance with the principles of the present invention;

FIG. 2 is a sectional view of the wheel of FIG. 1 taken substantially along the parting line II—II of FIG. 1;

FIG. 3 is a top plan view of a steering mechanism which may be employed with the wheel of FIGS. 1 and 2;

FIGS. 4, 5, and 6 and 7 are partial elevation sectioned and fragmentary views of the apparatus of FIGS. 1 and 2 wherein electromagnets ar employed, FIGS. 6 and 7 specifically showing means for maintaining movable electrical contact and compensating for skew of the annular magnetic means with respect to the longitudinal axis of the vehicle encountered during steering movements;

FIG. 8 is a sectional view similar to FIG. 2 showing a wheel having a controlled fluid leakage support system;

FIG. 9 is a partial fragmentary sectional view of the wheel of FIG. 8 taken along the line IX—IX;

FIG. 10 is an elevational view illustrating a rail type vehicle having a controlled air leakage support system; and FIG. 11 is a sectional view taken along the line XI—XI of FIG. 10.

DESCRIPTION OF THE PREFERRED EMBODIMENT

In FIG. 1 there is illustrated a wheel 10 which comprises a ring 11 magnetized across its thickness with its inner surface 12 and its outer surface 13 being at opposite magnetic polarities, for example, north and south poles, respectively. A permanent magnet 14 is disposed within the ring 11 and is magnetized to have, for example, a north pole at its lower side and a south pole at its upper side, whereby the permanent magnet 14 is repelled from the permanent magnet 11.

Referring to FIG. 2, a more detailed view of the apparatus of FIG. 1 is illustrated. The permanent magnet 14 is mounted within the magnetic ring 11 by means of a member 15 having an arm 16 for receiving the magnet 14 which may be secured by any suitable means. The member 15 also includes an arm 19 for attachment to the associated vehicle, and is made of nonmagnetic material.

Also shown in FIG. 2, but not in FIG. 1, is a nonmagnetic disc 20 which may be secured to the edge of the ring 11 by any suitable means. The disc 20 includes an aperture 21 and carries a bearing 22 for rotatably mounting a shaft 23. With the bearing 22 fixed to the disc 20, the ring 11 is journalled for rotation about the shaft 23. A similar nonmagnetic disc 20' with an aperture 21' and a flexible boot 37 may be utilized as a sealing means to prevent foreign matter from entering the ring 11. The member 15 includes a further arm 24 having a bore 25 with a bushing 17 therein for receiving a pin, machine screw or the like 26 which is secured to the shaft 23. The pin 26 and the bore 25 are dimensioned so as to permit relative vertical movement between the member 15 and the shaft 23 as forces of loading of the vehicle are changed. The part 26 will stop overloading before the magnet 14 touches the ring 11.

The bore 25 and the pin 26 may be shaped to restrict movement about a vertical axis thereof, but they may also be shaped to form a pivot about such vertical axis and the wheel 10 may be further provided with apparatus for steering the associated vehicle. Such apparatus may advantageously include a lever 27 which is pivotally connected at 28 to a steering linkage 29. In FIG. 3, the apparatus is illustrated for use with a rack and pinion mechanism wherein a rack 30 is carried on the steering linkage 29 and a pinion 31 is rotatably mounted for movement about an axis 32 whereby the elements 29, 27 and 23 pivot about vertical axes defined by the elements 26 and 28 to pivot the disc 20 and, accordingly, the ring 11 of the wheel 10. The rack 30 is of a width which will permit relative vertical movement of the pinion 31.

As illustrated in phantom in FIG. 2, the wheel 10 may be provided with a tire or the like 33 which is shaped to conform to the supporting surface. The supporting surface mentioned above may be any usual land surface including railway rails; however, the present invention when utilized for railway type applications, obviates the necessity for rails in that the diameter of the ring 11 is substantial with respect to the small concentrated area of magnetic repulsion between the ring 11 and the magnet 14 so that it appears as a flat surface and rotation thereof is, in effect, a continuous rail laying process. The substantially flat inner surface 12 of the ring 11 with respect to the magnet 14, and the width of the magnet 14 with respect to the width of the ring 11 permits an extensive arc of pivoting about the pin 26 without experiencing substantial changes in the forces of repulsion in that the ring 11 appears to the magnet 14 as a substantially flat surface in all directions.

Referring to FIGS. 4 and 5, a variation of the above structure is illustrated wherein a member 15' of similar structure with respect to the member 15 is provided for supporting an electromagnet 14' by means of an arm arrangement 16'. The electromagnet 14' includes terminals for connection to a power supply 36 by way of a pair of conductors 34, 35. The power supply 36 may advantageously be carried by the associated vehicle or, if desired, the power supply 36 may be extended to the vehicle by means of a rail system in a manner known per se.

The ring 11 may be a permanent magnet as discussed above, but may also advantageously be provided as an electromagnet as schematically indicated in FIG. 4 by the coil 37 and the connections 38, 39 to the power supply 36. In FIG. 5 the connections 38, 39 are illustrated as depending from the arm 16' as a pair of commutator-type contacts for sliding engagement with a plurality of coils 37a, 37b . . . 37n carried on the ring 11'. The number of coils connected in circuit with the power supply and the spacing of the coils are to be determined in accordance with the application, loading, etc. of the apparatus embodying the invention. Also, any desired combination of permanent magnets and electromagnets may be employed to fulfill the magnetic repulsion requirements of the apparatus 11', 14, 14', 37, 37a, 37b . . . 37n.

In FIG. 5 the conductors 38, 39 have been schematically illustrated to show their association with and connection to the electromagnets. FIGS. 6 and 7 provide a more detail showing of the electrical connections to the electromagnets and the means for supporting the connection elements.

In FIG. 6 a member 40 is secured to and depends from the shaft 23. The member 40 may advantageously be of tubular construction to guide and shield the electrical conductors 38, 39. The conductors 38, 39 terminate at the lower end of the member 40 in spring type contacts 41 and 42 for sliding engagement with the electromagnets 37.

The sliding contact with the electromagnets is illustrated in greater detail in FIG. 7 wherein an electromagnet 37 is illustrated as having plate like electrical terminals 44 and 46 which are engaged by respective contact elements 43 and 45. Preferably, the terminals 44 and 46 extend substantially the arcuate length of the electromagnet 37 and are separated from each other a distance sufficient to permit relative vertical movement upon loading between the pin 26 and the bore 25 while preventing contact between nonrespective ones of the elements 43, 45 and 44, 46. The length of the contacts 43, 45 is such that at least two electromagnets will be contacted at the same time in order to maintain a substantially constant magnetic field as rotation of the wheel 10 moves the gaps between the terminals of adjacent magnets past the contacts 43, 45.

During times when the wheel 10 is pivoted about the pin 26, the path of travel defined by the wheel along the supporting surface is at an angle to the longitudinal axis of the vehicle. Therefore, fixation of the apparatus which supports the electrical contacts to apparatus, such as the shaft 23, and which pivots with the electromagnets is preferred over fixation to chassis supported apparatus such as the member 15' in order to prevent excessive relative movement between, wear of and strain of the contacting elements which would occur during such times of relative skew. The conductors 38, 39 could be guided by means of separate fixed tubes or a branched tube structure to contact the electromagnets on opposite sides; however, the illustrated structure is more simple and more easily provided. The spring contacts 43, 45 may be constructed of resilient electrical spring contact material; in contrast thereto or in combination therewith, the tubular member 40, or a nontubular member with the conductors 38 and 39 attached thereto, may be constructed so as to provide the necessary spring contact resiliency.

Since a wheel constructed according to the present invention is substantially free of friction, a low power drive may be employed to drive the vehicle, such as a jet, propeller or friction wheel drive.

Referring to FIG. 8, the structure for a wheel is illustrated in much the same manner as that of FIG. 2. The wheel in FIG. 8, however, utilizes a controlled air leakage technique for providing lift and supporting the vehicle. A support system 100 includes a ring 111 having a pair of side plates 120, 120' secured thereto. The ring 111 has an inner surface 112 which, as will be understood below, cooperates with the lifting mechanism to support the vehicle. The ring 111 also has an outer surface 113 for engaging a roadway, or other suitable surface, and may be capped with a tire or the like 133 which is shaped to conform to the supporting surface.

A member 115 includes a portion 119 which is secured to the vehicle, which is symbolically indicated and referenced 157. The member 115 also includes a portion 124 having a vertical bore 125 lined with a sleeve type bushing 117. The plate 120 includes an aperture 121 for receiving a shaft 123 which is rotatably supported in a bearing 122 secured to the plate 120. A pin 126 extends from the shaft 123 and through the sleeve 117. The pin 126, the bore 125 and the sleeve 117 are dimensioned so as to permit relative vertical movement between the member 115 and the shaft 123 as the forces of loading of the vehicle are changed. The pin 126 will stop overloading before the member 115 strikes the cylinder 152 just as overloading was prevented before the magnet 14 touched the ring 11 in FIG. 2.

As was the case with respect to the apparatus of FIG. 2, the wheel of FIG. 8 may be constructed for steering, as indicated by the broken off member 127. Also, as illustrated in FIG. 2, the plate 120' includes an aperture 121' for receiving the portion 119 and any steering linkage, and may carry a flexible boot 137 to protect against foreign matter.

The member 115 has a lower end 116 which has a piston 151 depending therefrom. The piston 151 preferably has a circular cross section, and such a cross section is necessary if the wheel is to be of a steerable type. The piston 151 is received in a cylinder 152 which is supported by at least one arm or vertical member 153 carried by the shaft 123. The cylinder 152 is mounted with its lower end immediately adjacent, but not contacting, the inner surface 112 of the ring 111, so as to provide a minimum and controlled amount of air leakage. For this purpose the cylinder and the adjacent surface 112 may be precision machined. The vehicle is therefore levitated and supported by the concentrated vertical component of pressure between the surface of the piston and the opposed facing inner surface of the ring or upper surface of the rail structure discussed below.

Air under pressure is provided to the cylinder 152 by way of a passageway 154 which extends through the member 115 from the piston 151 to the distal end of the portion 119. The air pressure is provided to the passageway 154 from a tank or tanks 155 connected to a common line 156 by way of individual three-port valves, such as the valve 158. The valve 158 may be a remote controlled selectively operable solenoid valve mechanism to control the charging and discharging of the air tanks. A pressure gauge 159 is provided in communication with the line 156 and an air connector 160 may be provided for pressurizing the tanks.

Referring to FIGS. 10 and 11, a rail type vehicle 200 is illustrated as comprising a body 201 including a bottom wall 202. The vehicle 200 is supported on a rail 203 having, for example, a pair of upper supporting surfaces 204 separated by a center alignment rail 205.

A ski-like member 206 is mounted on the rail 203 and includes similar portions 207, 208 interconnected by an intermediate portion 209.

Referring in particular to FIG. 11, the portion 208 includes a pair of cylinders 210, 211 disposed above respective ones of the surfaces 204. When the vehicle is not moving, the lower ends of the cylinders 210, 211 actually contact the surfaces 204. The cylinders 210, 211 are connected transversely of the vehicle by a member 206 which includes a groove 212 shaped to receive the alignment rail 205. A pair of pistons 214, 215 extend into respective ones of the cylinders 210, 211 and are supplied with air under pressure by way of respective passageways 216, 217 which extend therethrough. The pistons 214, 215 are secured to a plate 218 carried on the lower surface of the lower wall 202 of the vehicle. When the vehicle is stationary the pistons move into the cylinders and are prevented from contacting the rail surfaces 204 as the upper ends of the cylinders engage the plate 218.

A plurality of air tanks 220 may be carried aboard or beneath the vehicle 200 and connected to a common air line 221 in the same manner as illustrated in FIG. 8, In FIG. 10 the line 221 is a pressure line feeding the pistons by way of forward and rear control valves 222, 223, which may also be remotely controlled selectively operable solenoid valves. In FIG. 10, a common charging and discharging line 224 is connected to the feed line 221 by a line 225 and it is the line 224, in this particular case, which will include the individual tank valves and air connector (such as the elements 158 and 160 in FIG. 8).

In order to minimize friction between the lower surface 228 of the member 206 and the surfaces 204 of the rail, wheels may be included in the member 206 for providing a small clearance. However, another feature of the invention provides a thin layer of air between the member 206 and the rail 203 through the utilization of small air passages 226 having a solenoid valve 227 and extending between the cylinders and the lower surfaces 228 of the member 206. With this design, not only are the pistons movable vertically with respect to the rail, but the member 206 is also movable vertically with respect to the rail.

In operation, air pressure is provided in the cylinders to lift the vehicle to a transport position and either wheels or a layer of air is provided to place the member 206 slightly out of contact with the surfaces 204. When reaching a designation and the supply of air under pressure is removed from the cylinders, the vehicle slowly settles to a rest position.

The fluid tanks may be recharged at way stations while a vehicle is being loaded and unloaded and/or from a compressed fluid supply produced on board by the propelling motor of the vehicle. In addition, when the vehicle has been brought to its speed of operation, the excess energy which was previously required for overcoming inertia, may be utilized for recharging the tanks while the vehicle is moving by compressing the gas or recycling the liquid employed as the fluid. The equipment and valving fo accomplishing this function is, of course, well known in the art.

Unlike hovercraft which employ the movement of a large volume of air beneath the craft, the present invention is concerned with a high pressure, controlled low leakage system for creating concentrated lifting forces for supporting a vehicle.

Although I have described my invention by reference to particular illustrative embodiments thereof, many changes and modifications of my invention may become apparent to those skilled in the art without departing from the spirit and scope of the invention. It is therefore to be understood that I intend to include within the patent warranted hereon all such changes and modifications as may reasonably and properly be included within the scope of my contribution to the art.

I claim:

1. A vehicle support system comprising:
a shaft;

an annular ring having an inner surface and an outer surface and mounted for rotation about said shaft;

means for connection to a vehicle disposed within said ring and having a lower end;

means for coupling said shaft and said connection means for relative vertical movement; and means for creating a lifting force between said inner surface of said ring and said lower end of said connection means.

2. The system of claim 1, wherein said connection means comprises a piston and comprising a hollow cylinder connected to said shaft receiving said piston and disposed immediately adjacent said inner surface and in a noncontacting relationship therewith, and means for applying fluid pressure to the interior of said cylinder to create a lifting force between said piston and said inner-surface.

3. The system of claim 2, wherein said means for applying fluid pressure includes a passageway extending through said piston and said connection means.

4. A vehicle support system, comprising:
at least one piston connected to a vehicle to be supported;
a hollow cylinder receiving said piston for relative vertical movement;
track means having an effectively endless upper track surface;
means for supporting said cylinder immediately above said track surface;
means for introducing fluid under pressure into said cylinder to create an upward force against said piston to support said vehicle.

5. The support system of claim 4, wherein said means for supporting said cylinder includes means for injecting an air flow between said cylinder and said track surface to provide a lifting force for said cylinder.

6. A wheel comprising:
a ring having an inner surface and an outer surface;

a disc connected to one edge of said ring and including an aperture which is concentric with the axis of said ring;

a bearing carried on said disc and a shaft having one end thereof extending through said aperture and mounted in said bearing for rotation of said disc and ring thereabout and another end disposed within said ring;

repelling means and means for connection to a vehicle frame mounting said repelling means within said ring below said shaft and adjacent said inner surface, said repelling means operable to provide a repelling force between said repelling means and said ring, said mounting means including an arm extending below said shaft and having a bore therein; and a pin depending from said shaft and extending through said bore for permitting free movement between said repelling means and said ring in response to loading changes of the vehicle.

7. The wheel of claim 6, wherein said repelling means includes a piston carried on said connection means and a cylinder receiving said piston and connected to said shaft.

* * * * *